United States Patent [19]

Takise et al.

[11] 3,715,488

[45] Feb. 6, 1973

[54] NOISE CANCELLATION CIRCUIT

[75] Inventors: Tadashi Takise; Takashi Okada, both of Tokyo, Japan

[73] Assignee: Sony Corporation, Shinagawa-ku, Tokyo, Japan

[22] Filed: April 1, 1971

[21] Appl. No.: 130,084

[30] Foreign Application Priority Data

April 3, 1970 Japan ................................45/28456

[52] U.S. Cl...........................178/7.3 S, 178/DIG. 12

[51] Int. Cl.............................H04n 5/04, H04n 5/44

[58] Field of Search.178/7.3 R, 7.3 S, 7.3 DC, 7.5 R, 178/7.5 S, 7.5 DC, DIG. 12

[56] References Cited

UNITED STATES PATENTS 3,579,251 5/1971 Lovelace ...........................178/7.3 R

*Primary Examiner*—Robert L. Richardson

*Attorney*—Lewis H. Eslinger, Alvin Sinderbrand and Curtis, Morris & Safford

[57] ABSTRACT

An amplifier circuit for stabilizing sync circuits and reducing noise voltage spikes that extend beyond sync signal level of a television signal. The television signal is applied through a rectifier and smoothing circuit to a differential amplifier, which includes a normally non-conductive switching element that forms part of a voltage divider for the television signal. The same signal, without rectification or smoothing, is also applied to the differential amplifier. Noise voltage peaks exceeding sync peaks cause the differential amplifier to make the switching element conduct and activate the voltage divider to divide the television signal in order to bring noise pulse peaks below the sync level.

8 Claims, 5 Drawing Figures

INVENTORS
TADASHI TAKISE
TADASHI OKADA
BY Lewis H. Eslinger
ATTORNEY

PATENTED FEB 6 1973 3,715,488

INVENTORS
TADASHI TAKISE
TADASHI OKADA
BY
ATTORNEY

NOISE CANCELLATION CIRCUIT

BACKGROUND OF THE INVENTION

1. Field of the Invention

This invention relates to the field of noise-reducing and synchronizing signal stabilization circuits for television receivers and the like. In particular, it relates to television receiver circuits for reducing noise impulses that have the amplitude and polarity to extend beyond the level of the synchronizing signals.

2. The Prior Art

Noise impulses of the same polarity as synchronizing signals and having an even greater amplitude have a tendency to interfere with line synchronization circuits in television receivers. Various circuits have been proposed heretofore to reduce the noise or its effects, such as clipping the noise peaks and passing the synchronizing signal through a relatively low pass amplifier. However, clipping is of no effect in the case of noise pulses that have an amplitude that exceeds the amplitude of the synchronizing signals. Passing a synchronizing signal through a narrow band or low pass amplifier deteriorates the synchronizing signal as well as the noise signals and may still not reduce the noise signals below a level at which they would interfere with the horizontal scanning circuits of the television receiver.

Apart from difficulties due to excessive noise impulses, television synchronizing circuits also suffer from signal amplitude variations which may periodically reduce the incoming signal to a point where it will not properly control the synchronizing circuits. For example, in the case of a portable receiver or a receiver subject to changing reflected signals from an airplane, some of the normal synchronizing pulses may be missing from the synchronizing signal after separation from the composite video signal.

It is one of the objects of the present invention to provide an improved circuit that will help stabilize the synchronization circuits of a television receiver and will reduce excessive noise pulses below the synchronizing level. Further objects will be apparent from the following specification together with the drawings.

BRIEF DESCRIPTION OF THE INVENTION

The circuit of the present invention includes a voltage divider across which a television signal is applied. Part of the voltage divider is a normally non-conductive transistor which is connected as a switching element in a differential amplifier circuit. The invention also includes a rectifier and smoothing circuit to operate on the television signal before it is applied to one input terminal of the differential amplifier. The television signal, without rectification or smoothing, is applied to a second input terminal of a differential amplifier at a voltage level that corresponds to the voltage level of the rectified and smoothed signal. As a result, the differential amplifier conducts only at the occurrence of noise impulses that exceed the amplitude of the synchronizing signals. When the differential amplifier does conduct, it completes the circuit of the voltage divider and substantially reduces the level of the output signal for the duration of the noise impulse without affecting the remainder of the television signal.

DETAILED DESCRIPTION OF THE DRAWINGS

Figure 1:
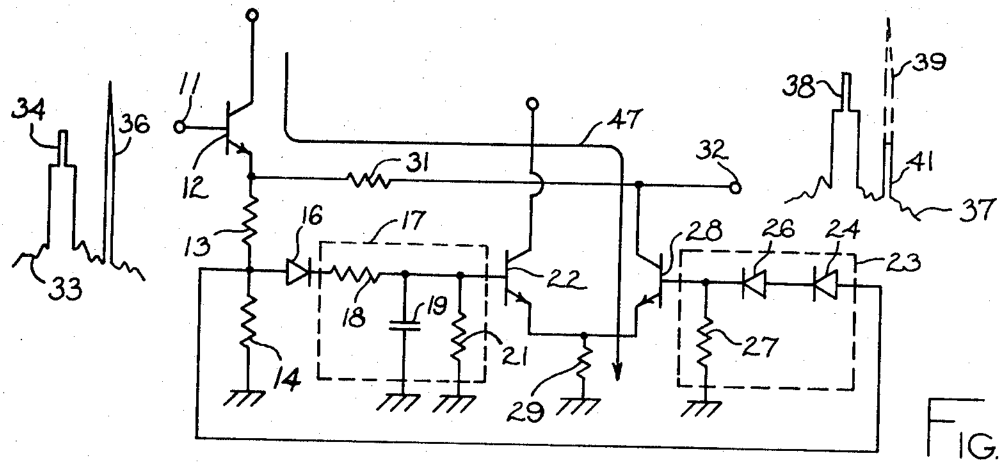
FIG. 1 is a circuit diagram of one embodiment of the invention.

The circuit of FIG. 1 comprises an input terminal 11 connected to the transistor 12 of an emitter follower circuit. A first voltage divider comprising two resistors 13 and 14 is connected in series between the emitter and ground. A peak rectifying circuit comprising a diode 16 and a smoothing, or integrating, circuit 17 is connected to the common junction between the resistors 13 and 14. The smoothing circuit 17 comprises a series resistor 18 and a parallel shunt circuit including a capacitor 19 and another resistor 21. The output of the smoothing circuit 17 is connected to the base of a second transistor 22 which is part of a differential amplifier circuit.

Also connected to the common junction between the resistors 13 and 14 is a voltage dropping circuit 23 comprising two diodes 24 and 26 connected in series. The output of the voltage dropping circuit 23 is connected to the base of a transistor 28, the emitter of which is connected to the emitter of the transistor 22. A shunt resistor 27 is also connected between the base of the transistor 28 and the circuit ground. A resistor 29 is connected in series between the two emitters and ground. This resistor 29, another resistor 31, and the emitter-collector output circuit of the transistor 28 form a voltage divider. The output terminal of the voltage divider and of the circuit itself is indicated by reference numeral 32.

The operation of the circuit of FIG. 1 will be described in connection with the waveform diagrams shown in FIG. 1 and, on an enlarged scale, in FIG. 2. The television signal applied to the input terminal 11 is indicated by reference numeral 33 and includes a synchronizing pulse 34 and a noise pulse 36 that has the same polarity as the pulse 34 but is of even greater amplitude. When this signal is applied to the emitter follower circuit, a similar signal of substantially the same amplitude and indicated by reference numeral 37 is derived at the output terminal 32. This signal includes the synchronizing pulse 38 and a noise pulse initially having an amplitude indicated by reference numeral 39 but reduced by the operation of the circuit to an amplitude indicated by reference numeral 41.

Figure 2:
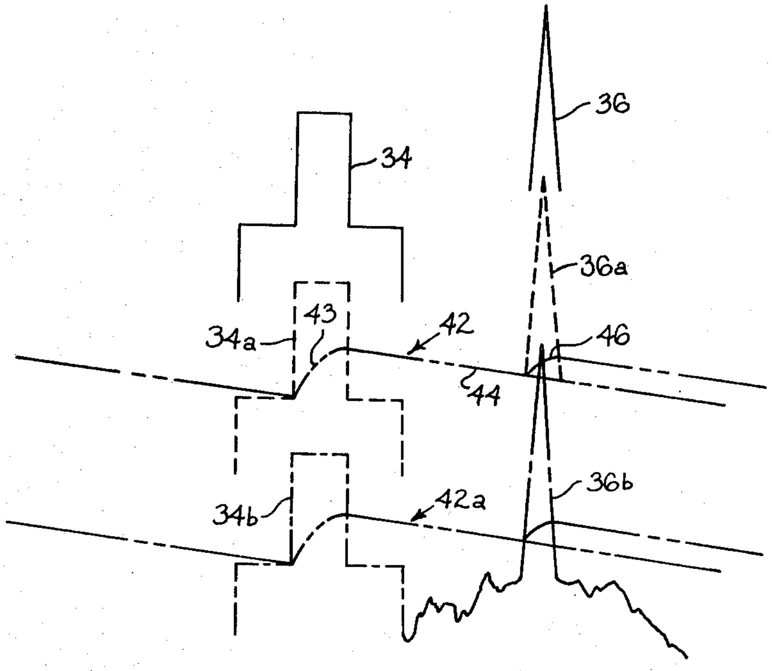
FIG. 2 shows a series of waveforms at various points in the circuit of FIG. 1.

The essential parts of the signal as applied to the input terminal 11 are shown in FIG. 2 in solid lines. These include the synchronizing pulse 34 and the noise pulse 36. The absolute voltage level of these portions of the signal is not of major concern as long as they are within the proper operating range of the transistor 12. Therefore, the same waveforms may be considered to be representative of the signal at the junction between the resistors 13 and 14.

When this signal passes through the diode 16 it incurs a drop of about 0.6 volt due to the characteristics of the diode. This reduced voltage is indicated by the synchronizing pulse **34*a* and the noise pulse 36*a* in dotted form, both of which have a voltage level of 0.6 volt below their corresponding initial waveforms 34 and 36 in FIG. 2. When the signal that comprises the pulses 34*a* and 36*a* is filtered through the smoothing circuits 17, all high frequency components are greatly reduced in amplitude and the resulting output signal applied to the base of the transistor 22 is indicated by the broken line 42. As may be seen, this broken line includes an exponential build-up section 43 and an exponential decay section 44. The build-up section occurs during the synchronizing pulse 34*a* and the decay section extends to the occurrence of the next horizontal synchronizing pulse. The actual slope of the sections 43 and 44 may be different from those shown in the drawing, which are only illustrative. There is another section of voltage build-up due to the noise pulse 36*a* and this occurs in the region indicated by reference numeral 46. The voltage 42 suffers a further drop of about 0.6 volt in passing from the base to the emitter of the transistor 22 so that the voltage across the resistor 29 is indicated by reference numeral 42*a***.

The signal across the resistor 14 is also applied to the circuit 23 to set a level corresponding to the level of the circuit available at the emitter of the transistor 22. In passing through the diode 24, the television signal that includes the synchronizing pulse 14 and the noise pulse 36 of FIG. 2 undergoes a first shift downward of about 0.6 volt to a level that is about the same as at the input to the smoothing circuit 17. This level is represented by the dotted signals **34*a* and 36*a* in FIG. 2. In passing through the second diode 26 the signal undergoes a further negative shift of 0.6 volt so that the synchronizing pulse occupies the level 34*b* and the noise pulse occupies the level 36*b* in FIG. 2. This is the voltage that is applied to the base of the transistor 28** which is normally non-conductive.

The transistor 28 is, in effect, a switching element that is normally non-conductive. In order for the transistor 28 to become conductive the voltage applied to its base must exceed the voltage applied to its emitter by a large enough amount to overcome the inherent voltage drop between these two elements. Thus, the transistor 28 becomes conductive when the noise pulse **36*b* exceeds the level 42. The transistor 28 is not conductive during the synchronizing pulse, which is at a lower level than the voltage 42. As soon as the transistor 28 does become conductive, it draws a current indicated by the arrow 47 and it completes the voltage divider circuit that includes the resistors 29 and 31. As a result, the output voltage at the terminal 32 is diminished by the voltage division ratio to the level 41 shown in FIG. 1. By making this ratio sufficiently low, the tip of the remaining noise pulse 41 may be kept below the lowest level of the synchronizing portion 38 of the total television signal 37**. As a result there will be a substantial reduction in interference with the synchronization of a television receiver that includes this circuit.

The circuit in FIG. 1 does more than simply minimize the adverse effects of high level noise pulses. Because the transistors 22 and 28 are connected as a differential amplifier and are both supplied with signals derived from the same point, the junction between the resistors 13 and 14, the absolute signal level is of less importance than it would otherwise be. As a result, the level of the signal at the output terminal 32 tends to be stabilized. This is advantageous in the case of a signal which has an amplitude that varies widely over a relatively long period of time. Such signals are sometimes caused by multipath transmission that includes a moving reflective structure such as an airplane. In that case, the amplitude of the incoming signal may vary more than is permissible for proper operation of the synchronizing section of the receiver. For example, receivers are typically designed so that the signal can change by as much as about 3 db. without going out of synchronization. However with the circuit of the present invention the amplitude of the signal may change as much as 6 db. without going out of synchronization.

Figure 3:
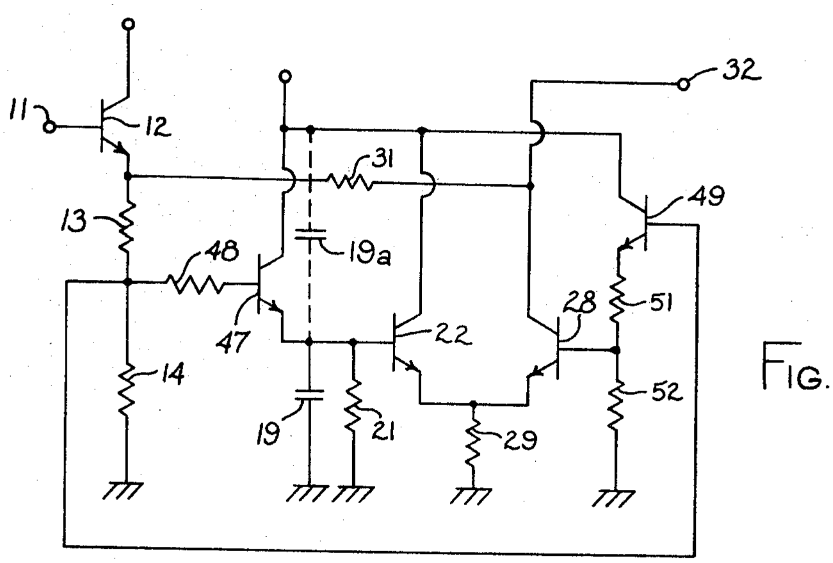
FIG. 3 is a circuit diagram of a modified embodiment of the invention.

FIG. 3 shows a modified form of this circuit of the invention. The components that correspond to like components in FIG. 1 are identified by similar reference numerals. In place of the unidirectionally conductive diode 16 of FIG. 1, the circuit in FIG. 3 includes a transistor 47 operated as an emitter follower. The current flow in the base-emitter circuit is also unidirectional. The base of the transistor 47 is connected to the junction of the resistors 13 and 14 by an isolating resistor 48 and the emitter of this transistor is connected directly to the base of transistor 22. An integrating circuit comprising the capacitor 19 and a parallel resistor 21 is connected between the emitter of the transistor 47 and ground, although a capacitor 19a between the emitter and the positive supply potential may be substituted for the capacitor 19 if desired.

Instead of the voltage controlling circuit 23 with diodes in it, the circuit in FIG. 3 utilizes a transistor 49 connected as an emitter follower and having an emitter load comprising a voltage divider made up of a resistor 51 connected in series with another resistor 52. The junction between these two resistors is connected to the base of the switching element transistor 28 that forms part of the differential amplifier and part of the voltage divider circuit. The voltage divider also includes the resistors 29 and 31. The output signal of the circuit in FIG. 3 is also taken from the output terminal 32.

The operation of the circuit in FIG. 3 is basically the same as that in FIG. 1. The base/emitter voltage drop of the transistor 47 is approximately equal to the voltage drop across the diode 16 in FIG. 1. Therefore the voltage applied to the base of the transistor 22 in FIG. 3 is substantially the same as the voltage applied to the base of the corresponding transistor 22 in FIG. 1.

The signal applied to the base of the transistor 49 is the same signal as in the case of FIG. 1 and has the horizontal synchronizing pulse 34 and the noise pulse 36 shown in FIG. 2. the level of this signal is reduced by the drop between the base and emitter of the transistor 49, and there is a further decrease in this signal by virtue of the voltage divider consisting of the resistors 51 and 52. As a result, the voltage applied to the base of the transistor 28 in FIG. 3 is substantially equal to the voltage applied to the base of the corresponding transistor 28 in FIG. 1 and the effect in reducing the noise pulse is the same. However, the circuit in FIG. 1 is better adapted to manufacture as an integrated circuit than the circuit in FIG. 3.

Figure 4:
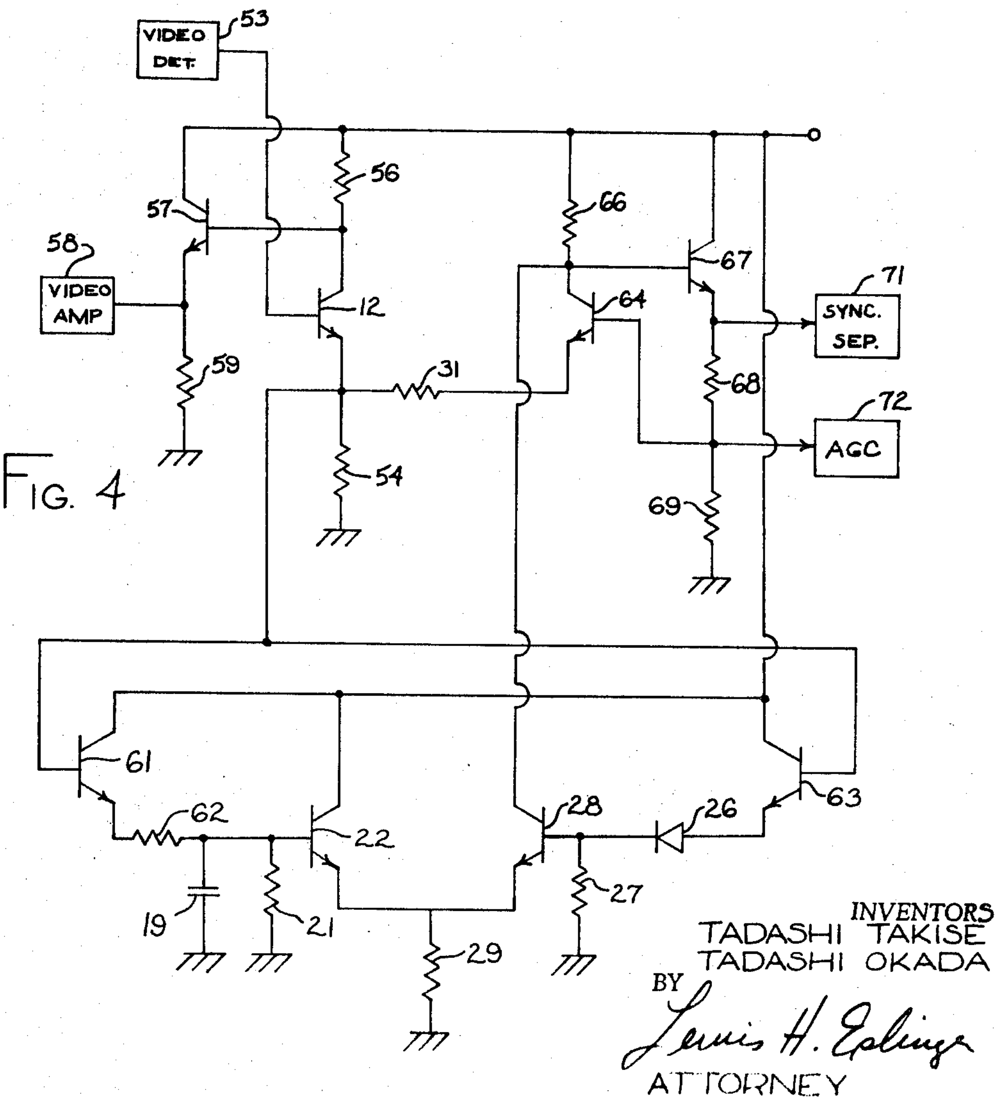
FIG. 4 shows the noise reducing circuit of the present invention included in a television receiver.

FIG. 4 shows a more complete circuit which is quite suitable for manufacture in integrated circuit form and is incorporated in a television receiver. The video signal is obtained from a video detector 53 and applied to the base of the transistor 12. The transistor has a load 54 in its emitter circuit and another load 56 in its collector circuit. A transistor 57 has its base connected to the collector of the transistor 12 and its emitter connected to a video amplifier 58 and to a load impedance 59.

The emitter of the transistor 12 is connected to the base of another transistor 61 comparable to the transistor 47 in FIG. 3, and the output of the transistor 61 is connected to a smoothing circuit comprising a series resistor 62 and a capacitor 19 and resistor 21 similar to the previous circuits. The output of this smoothing circuit is connected to one of the inputs of the differential amplifier comprising the transistors 22 and 28 with a common emitter load 29.

The voltage dropping section of the circuit in FIG. 4 comprises a transistor 63, which is comparable to the transistor 49 in FIG. 3, and the diode 26 connected between the emitter of this transistor and the base of the transistor 28.

The collector of the transistor 28 is connected to the collector of a transistor 64 and a load impedance common to both the transistors 28 and 64. The resistor 31 is connected between the emitter of the transistor 12 and the emitter of the transistor 64. The collectors of the transistors 28 and 64 are also connected to the base of the transistor 67, which is an emitter follower having two load resistors 68 and 69 connected in series. The junction between these two resistors is connected back to the base of the transistor 64 to provide negative feedback to improve the operation of this circuit. A synchronizing signal separation circuit 71 is connected directly to the emitter of the transistor 67 and an automatic gain control circuit 72 is connected to the junction of the resistors 68 and 69.

In operation, the video detector 53 supplies the same television signals shown in FIG. 2 and comprising the horizontal synchronizing pulse 34 and the noise pulse 36. This signal is connected to the base of the transistor 12 and is amplified by the transistor and fed to the transistor 57 which, in turn, transmits the signal to the video amplifier 58.

The transistor 12 also supplies a signal from its emitter to the transistor 61. There is a drop of approximately 0.6 volt between the emitter and base of the transistor 61, and the output of this transistor is passed through the smoothing circuit to supply a signal corresponding to the signal 42*a* of FIG. 2 to the base of the transistor 22. The same television signal is also supplied to the base of the transistor 63. There is a voltage drop between the base and emitter of this transistor and another voltage drop across the diode 26 to bring the level of the television signal to that corresponding to the horizontal synchronizing pulse 34*b* and the noise pulse 36*b* in FIG. 2. Thus, the signals applied to the transistors 22 and 28 in FIG. 4 are the same as those applied to the corresponding transistors in FIG. 1.

When the transistor 28 becomes conductive in response to the noise pulse 36*b*, it drops the level of the signal at the collectors of the transistors 28 and 64 and, in effect, reduces the peak of the noise voltage to a level below the synchronizing signal. This modified signal is passed through the emitter follower transistor 67 to the synchronizing signal separation circuits 71 and, with reduced amplitude, to the automatic gain control circuit 72. The signal across the resistor 69 is also fed back to the base of the transistor 64 to improve the operation of this transistor.

Figure 5:
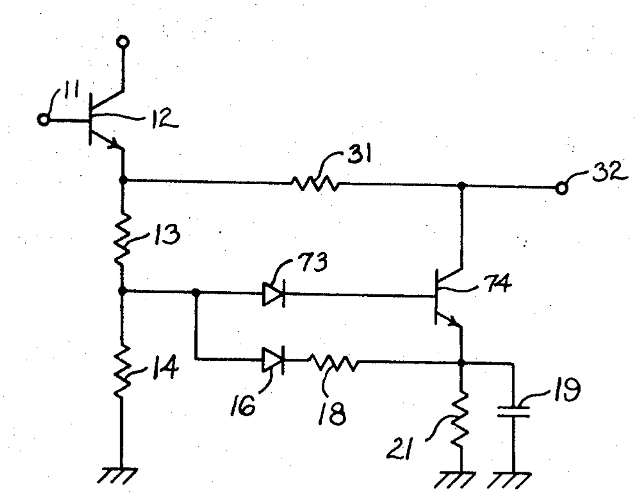
FIG. 5 is a circuit diagram of still another form of the invention.

FIG. 5 shows still another embodiment of the invention. This embodiment uses the same input transistor 12 as FIG. 1 and the same voltage divider resistors 13 and 14 connected to the emitter. In addition the circuit in FIG. 5 includes the same diode 16 and smoothing circuit comprising the resistor 21. A single voltage dropping diode 73 connects the junction of the resistors 13 and 14 to the base of a transistor 74. The collector of this transistor is connected to the output terminal 32 and the emitter is connected to the output of the smoothing circuit across the capacitor 19.

In operation, the television signal applied to the transistor 12 is directed through the rectifier 16 to the smoothing circuit and the output of the smoothing circuit is indicated in FIG. 2 by reference numeral 42. The television signal without rectification or smoothing, is applied through the diode 73 to the base of the transistor 74. This transistor is normally non-conductive but is made conductive when the relation between the voltage applied to its base and emitter is such as to make the base positive with respect to the emitter. This condition exists when a noise pulse of the type shown as the pulse 36 in FIG. 2 is applied to the base of the transistor. When the transistor 74 becomes conductive it completes the voltage divider circuit and reduces the output voltage at the terminal 32 for the duration of the noise pulse.

What is claimed is:

1. A noise reduction and synchronization stabilization circuit comprising:

A. Circuit means having a common terminal, an input terminal and an output terminal, means connecting the input terminal to the output terminal to transmit therebetween a television signal including synchronizing pulses having a pre-determined polarity and noise pulses, and a first voltage dividing circuit for providing a first signal representative of said television signal but reduced in amplitude by a predetermined amount;

B. Unidirectionally conductive means connected to said first voltage dividing circuit to provide a rectified output signal;

C. A smoothing circuit connected to said first voltage dividing circuit for rectifying said first signal and smoothing out amplitude variations in said rectified first signal; and D. A switching element including 1. a first input connected to said output of said unidirectionally conductive means, and
2. a second input connected to said smoothing circuit to be energized by the output signal therefrom, said switching element being conductive during noise impulses that exceed the amplitude of said synchronizing pulses;

E. A second voltage dividing circuit connected in series with said switching element between said common terminal and said output terminal to reduce the amplitude of said television signal at said output terminal during said noise impulses so that the amplitude of the noise pulse is at a level below that of the synchronizing pulse.

2. The circuit of claim 1, wherein said switching element comprises:

A pair of transistors, said transistors having their emitters connected together to form a differential amplifier; and A common emitter load for said transistors.

3. The circuit of claim 1 in which said unidirectionally conductive means comprises first and second diodes connected in series between said first voltage dividing circuit and said first input of said switching element.

4. The circuit of claim 1 in which said unidirectionally conductive means comprises a transistor connected in an emitter follower circuit.

5. The circuit of claim 1 in which said circuit means connecting said input terminal to said output terminal comprises an emitter follower transistor amplifier, and said unidirectionally conductive means includes a diode connected to an output of said emitter follower.

6. The circuit of claim 5 in which said switching element comprises a second transistor and a third transistor, the emitters of said second and third transistors being connected together, and a common emitter load for said second and third transistors, said smoothing circuit being connected to the base of said third transistor; and voltage level setting means connecting said output of said emitter follower transistor amplifier to the base of said second transistor.

7. The circuit of claim 6 in which said voltage level setting means comprises at least one diode.

8. The circuit of claim 6 in which said voltage level setting means comprises a fourth transistor connected in an emitter follower circuit.

* * * * *